United States Patent [19]

Louie

[11] Patent Number: 5,195,704
[45] Date of Patent: Mar. 23, 1993

[54] NEUTRAL CONDUCTOR CLAMP

[75] Inventor: Paul Louie, Scarborough, Canada

[73] Assignee: A.B. Chance Company, Centralia, Mo.

[21] Appl. No.: 817,774

[22] Filed: Jan. 8, 1992

[51] Int. Cl.$^5$ .............................................. F16L 3/00
[52] U.S. Cl. ................................ 248/67.5; 248/74.4; 248/316.6
[58] Field of Search ............... 248/74.4, 67.7, 67.5, 248/316.6, 231.6, 63, 66; 174/162, 163 R, 155, 156, 157, 168

[56] References Cited

U.S. PATENT DOCUMENTS

| | | | |
|---|---|---|---|
| 1,911,334 | 5/1933 | Williams | 248/66 |
| 2,099,465 | 11/1937 | Burleson | 248/74.4 X |
| 2,979,299 | 4/1961 | Huggins | 248/67.5 |
| 3,198,464 | 8/1965 | Huggins | 248/67.5 |
| 3,288,409 | 11/1966 | Berthea, Jr. | 298/316.6 X |
| 3,561,708 | 2/1971 | Dubey | 248/63 |
| 3,592,426 | 7/1971 | Dubey | 248/67.5 |

FOREIGN PATENT DOCUMENTS

| | | | |
|---|---|---|---|
| 321874 | 11/1929 | United Kingdom | 174/157 |
| 431569 | 7/1935 | United Kingdom | 174/157 |

Primary Examiner—Karen J. Chotkowski
Attorney, Agent, or Firm—Hovey, Williams, Timmons & Collins

[57] ABSTRACT

A clamp for suspending a conductor from a support structure includes a body and a cover, each provided with a conductor-supporting surface having a trough and a set of upstanding tabs lining the sides of the trough and protruding from the conductor-supporting surface. The tabs on the cover are spaced from the tabs on the body in the longitudinal direction of the troughs such that the two sets of tabs intermesh when the cover is positioned on the body. The cover is movable between first and second positions in which the troughs, together with the two sets of tabs, enclose the circumferential surface of a conductor retained in the aparatus. A plurality of conductors may be accommodated by a single clamp construction.

5 Claims, 2 Drawing Sheets

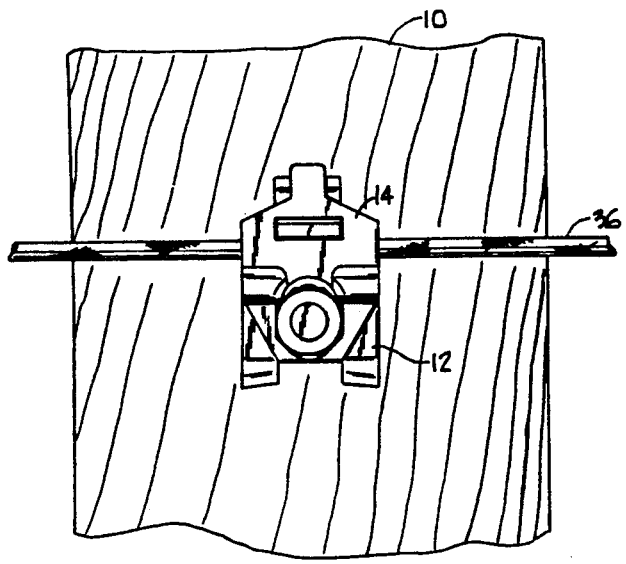
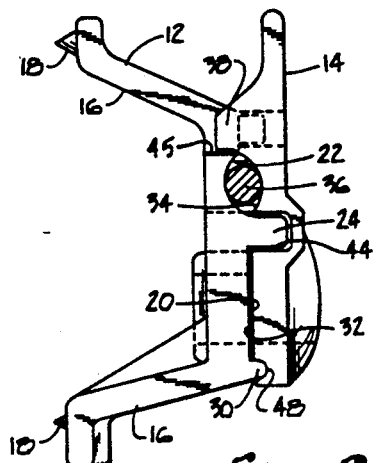
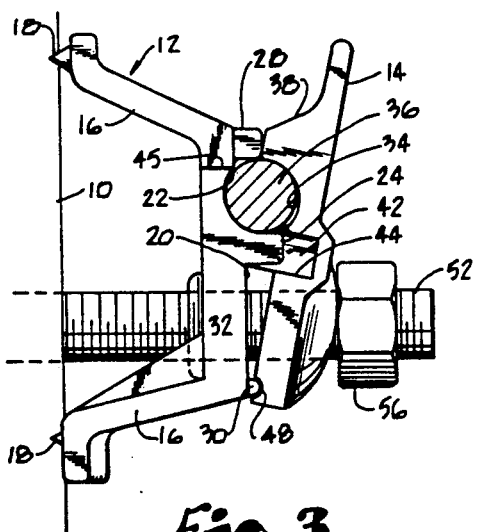
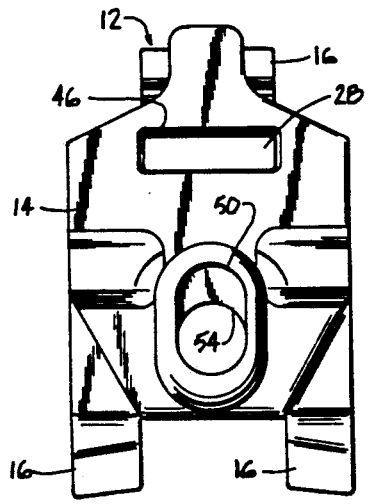
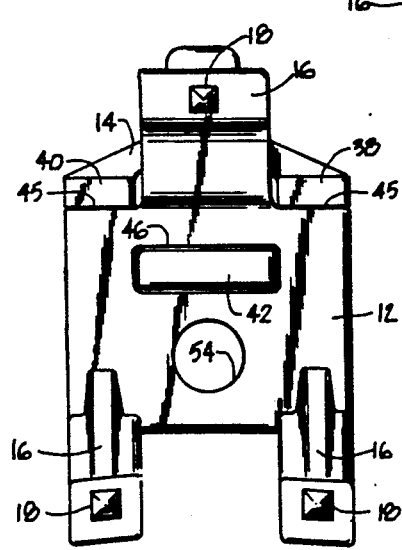

NEUTRAL CONDUCTOR CLAMP

BACKGROUND OF THE INVENTION

1. Field of the Invention

The present invention relates generally to clamps and, more particularly, to a clamp for suspending a neutral conductor from a support structure such as a utility pole.

2. Discussion of the Prior Art

It is known to provide a clamp on a utility pole or the like for suspending a cable therefrom. An example of such a known device is illustrated in U.S. Pat. No. 3,042,353, wherein a clamp is provided with a base plate and a keeper. The base plate and keeper are secured to the utility pole by a threaded bolt, and the keeper is positionable in either of two positions; an open position in which a hook defined by the base plate remains uncovered, and a closed position in which the keeper partially covers the area defined by the hook.

Another example of a conventional clamp is illustrated in U.S. Pat. No. 776,695, and includes a base portion which is secured to a utility pole and provided with a groove which forms a seat for a messenger wire. A clamp plate may be attached to the base portion by a pair of bolts, and includes a groove that opposes the groove in the base portion in order to secure the messenger wire.

As shown in U.S. Pat. No. 2,886,270, a fastening device is illustrated for use in securing a cable to a supporting member. The fastening device is secured to the supporting member by a bolt and includes an arched portion adapted to receive the cable and a projection extending from the arched portion into an aperture in the support structure. The projection serves to prevent the fastener from rotating about the bolt.

Numerous drawbacks have been experienced in the use of conventional devices. For example, none of the conventional devices are able to accommodate a wide range of conductor or line sizes in a single construction, and it is necessary to stack several different sizes of the clamps if a range of conductors are employed by the particular user. It would be desirable to provide a clamp which will accept any conductor ranging in size between 8 and 17 millimeters in diameter, while retaining a grip on the conductor and preventing axial pullout thereof.

Another problem encountered in conventional devices is that the conductor has a tendency to pull free from the clamp in a vertical direction when the conductor experiences loading such as ice forming on the length of the conductor extending between a pair of utility poles. Also, transverse loading of the cable may occur, which causes the cable to pull from the clamp in a direction transverse to the height of the utility pole by pulling the clamp apart.

OBJECTS AND SUMMARY OF THE INVENTION

It is an object of the present invention to overcome the problems and drawbacks experienced in conventional clamp devices, and to provide a clamp capable of securely retaining conductors of various diameter therein without the threat of the conductor slipping in the axial direction thereof or of being pulled from the clamp in any direction perpendicular to the length of the conductor.

A clamp constructed in accordance with these and other objects includes a body and a cover, each provided with a conductor-supporting surface having a trough and a set of upstanding tabs lining the sides of the trough and protruding from the conductor-supporting surface. The tabs on the cover are spaced from the tabs on the body in the longitudinal direction of the troughs such that the two sets of tabs intermesh when the cover is positioned on the body. The cover is movable between first and second positions in which the troughs, together with the two sets of tabs, surround the circumferential surface of a conductor retained in the apparatus. A plurality of conductor sizes may be accommodated by a single clamp construction.

BRIEF DESCRIPTION OF THE DRAWING FIGURES

A preferred embodiment of the present invention is described in detail below with reference to the attached drawing figures, wherein:

FIG. 1 is a front elevational view of a clamp constructed in accordance with a preferred embodiment of the present invention, wherein the clamp is mounted on a utility pole;

FIG. 2 is a side elevational view of the clamp, wherein a conductor having a relatively small diameter is retained therein;

FIG. 3 is a side elevational view of the clamp, wherein a conductor having a relatively large diameter is retained therein;

FIG. 4 is a front elevational view of the clamp;

FIG. 5 is a rear elevational view of the clamp;

DETAILED DESCRIPTION OF THE PREFERRED EMBODIMENT

Figure 6:
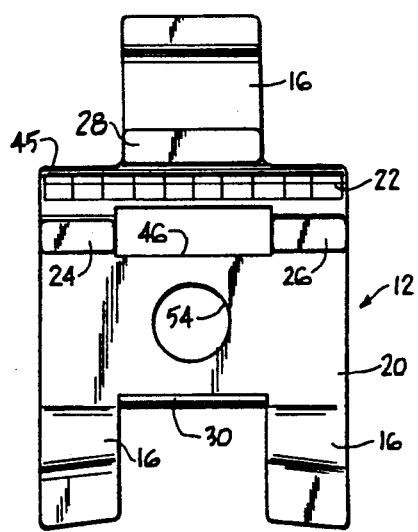
FIG. 6 is a front elevational view of the body of the clamp.

A clamp apparatus for suspending a neutral conductor or the like is illustrated in FIG. 1, as being secured to a support structure such as a utility pole 10.

Turning to FIG. 3, the clamp includes a body 12 and a cover 14, both formed of ductile or malleable iron or the like. The body 12 includes means for engaging the support structure, this means being a plurality of legs 16 extending outward from the body and having tips 18 adapted to penetrate the surface of the support structure to position the body relative thereto. A first conductor-supporting surface 20 is defined on the body and includes a first elongated trough 22 having opposed axial ends and a curved wall surface.

As shown in FIG. 6, a first set of upstanding tabs 24, 26, 28 line the sides of the first trough 22 and protrude from the first conductor-supporting surface 20 in a direction away from the body. The two tabs 24, 26 are provided along one side of the first trough 22 and are spaced from one another, with each of the tabs being positioned adjacent one of the axial ends of the trough. The tab 28 is provided along the opposite side of the first trough, and this tab is disposed intermediate the axial ends of the trough.

Returning to FIG. 3, a ridge 30 is formed in the body on the conductor-supporting surface at a position spaced from the trough 22 in order to define a pivot axis for the cover so that, when the cover is positioned on the body, the cover may be pivoted about the axis defined by the ridge.

Figure 7:
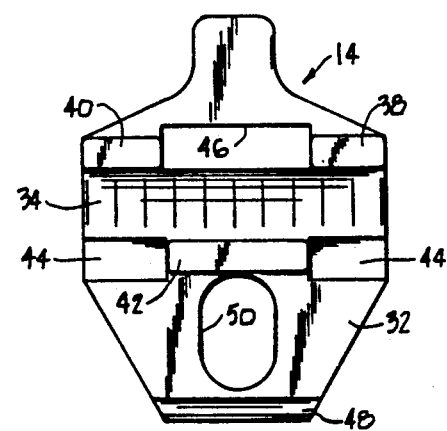
FIG. 7 is a front elevational view of the cover of the clamp.

The cover 14 includes a second conductor-supporting surface 32 provided with a second elongated trough 34 which is in alignment with the first trough 22 when the cover is positioned on the body. The second trough 34 includes opposed axial ends and a curved wall surface having a diameter substantially equal to the diameter of the wall surface of the first trough. Each of the troughs 22, 34 preferably include a plurality of grooves or ridges extending in a direction transverse to the lengths of the troughs, as shown in FIGS. 6 and 7, for gripping a conductor 36 retained in the clamp.

A second set of tabs 38, 40, 42 line the sides of the second trough 34 and protrude from the second conductor-supporting surface 32. The second set of tabs are spaced from the first set of tabs 24, 26, 28 in the longitudinal direction of the troughs such that the first and second sets of tabs intermesh when the cover is positioned on the body. The two tabs 38, 40 are provided along a side of the second trough 34 opposing the side of the first trough 22 on which the tab 28 is disposed. These two tabs 38, 40 are spaced from one another by a distance sufficient to accommodate the tab 28 of the body. Each of the tabs 38, 40 is positioned adjacent one of the axial ends of the second trough 34. The tab 42 is provided along the opposite side of the second trough opposing the side of the first trough 22 on which the two tabs 24, 26 are disposed. This tab 42 is located intermediate the axial ends of the trough and is accommodated between the two tabs 24, 26 of the body.

Preferably, the body and cover are provided with recesses 44, 45, 46 adjacent the tabs 24, 26, 28, 38, 40, 42. These recesses are positioned to receive the tabs of the opposing member aligned therewith in order to permit the first and second conductor-supporting surfaces to be pressed into contact with one another. As shown in FIGS. 4 and 5, the central recess 46 defined in the body on one side of the troughs 22, 34 and the central recess 46 defined in the cover on the opposite side of the troughs, as well as the recesses 45 defined adjacent the axial ends of the first trough 22, extend completely through the body and cover. This permits a greater range of conductors to be clamped in the apparatus without a reduction in the ability of the clamp to secure the conductor against axial, vertical and transverse movement relative to the clamp. The recesses 44 provided on the cover do not extend completely through the body or cover, and are provided adjacent the axial ends of the troughs and positioned to receive the tabs 24, 26, 38, 40.

The cover 14 includes a groove 48 formed in the second conductor-supporting surface 32. The groove is spaced from the second trough 34 and bears against the ridge 30 of the body in order to permit the cover to be pivoted relative to the body while maintaining the alignment of the first and second troughs. The cover is movable relative to the body between a first position, as shown in FIG. 2, and a second position, as shown in FIG. 3. In an exemplary embodiment, when the clamp is closed onto a conductor in either of these positions, or in any position therebetween, the clamp is capable of supporting the conductor if the conductor has a diameter of between about 8 and 17 millimeters. Further, such conductors may be retained securely without permitting the conductor to be pulled from the clamp either axially or in a direction perpendicular to the length of the conductor.

Because of the arrangement of the troughs 22, 34 and the first and second sets of tabs, a conductor-retaining structure is defined having a closed circumference such that the circumferential surface of a conductor supported in the apparatus is completely retained within the structure. In other words, because of the intermeshing relationship between the tabs 24, 26, 28 provided on the body and the tabs 38, 40, 42 on the clamp, it is possible for the cover to be pivoted relative to the body to accommodate conductors of various sizes, while presenting a conductor-retaining structure that completely surrounds the conductor.

Although portions of the conductor 36 may be visible within the clamp when the clamp is viewed from opposite the pivot axis defined by the ridge 30, structure is provided along at least a portion of the length of the troughs at every circumferential position of the conductor such that the conductor is completely surrounded.

As shown in FIG. 4, the cover is provided with a hole 50, in the form of a slot, adapted to receive a threaded rod 52. The body includes a threaded hole 54 aligned with the slot 50. As illustrated in FIG. 3, the threaded rod 52 is secured to and extends through the utility pole 10, and extends through the holes 50, 54. A nut 56 is threaded onto the rod over a square washer and a spring lock washer, neither of which are illustrated in the figures, and is tightened against the cover to press the cover against the body and to clamp the conductor within the troughs 22, 34.

By providing this construction, it is possible to simultaneously clamp the conductor between the cover and body and to secure the apparatus to the support structure. Thus, one securing means is used for pressing the cover onto the body and holding the clamp apparatus against the support structure.

Although the invention has been described with reference to the illustrated preferred embodiment, it is noted that substitutions may be made and equivalents employed herein without departing from the scope of the invention as set forth in the claims.

What is claimed is:

1. A clamp apparatus for suspending a conductor from a support structure, the clamp apparatus comprising:
   a body having means for engaging the support structure and for positioning the body relative to the support structure, the body including a first conductor-supporting surface provided with a first trough having opposed sides and a curved wall surface, and a first set of upstanding tabs lining both sides of the first trough and protruding from the first conductor-supporting surface;
   - a cover including a second conductor-supporting surface provided with a second trough having opposed sides and a curved wall surface, and a second set of upstanding tabs lining both sides of the second trough and protruding from the second conductor-supporting surface, the second set of tabs being spaced from the first set of tabs in the longitudinal direction along both sides of the troughs such that the first and second sets of tabs intermesh when the cover is positioned on the body,
   the cover being movable relative to the body between first and second positions in which the troughs, together with the first and second sets of tabs, define conductor-retaining structure having a closed circumference such that the circumferential surface of a conductor retained in the apparatus is completely surrounded, the circumference defined by the conductor retaining structure being smaller when the cover is in the first position than when the cover is in the second position so that the apparatus is capable of suspending any of a plurality of conductors having different diameters from one another; and securing means for pressing the cover onto the body and holding the clamp apparatus against the support structure.

2. The clamp apparatus as recited in claim 1, wherein the means for engaging the support structure and for positioning the body relative to the support structure includes a plurality of legs provided on the body and extending away from the first conductor-supporting surface.

3. The clamp apparatus as recited in claim 1, wherein the body and cover are each provided with a hole through which the securing means passes, the securing means including a threaded rod secured to the support structure, and a nut that may be threaded onto the rod to press the cover against the body.

4. The clamp apparatus as recited in claim 1, further comprising positioning means for positioning the cover on the body and for permitting relative pivotal movement of the cover between the first and second positions.

5. The clamp apparatus as recited in claim 4, wherein the positioning means includes a ridge provided on the first conductor-supporting surface of the body and extending in a direction parallel with the first trough, and a groove provided in the second conductor-supporting surface adapted to bear against the ridge.

* * * * *